US009722769B2

United States Patent
Komori et al.

(10) Patent No.: US 9,722,769 B2
(45) Date of Patent: Aug. 1, 2017

(54) EQUALIZER

(71) Applicant: HITACHI, LTD., Tokyo (JP)

(72) Inventors: Takemasa Komori, Tokyo (JP); Hideki Koba, Tokyo (JP); Junya Nasu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/045,372

(22) Filed: Feb. 17, 2016

(65) Prior Publication Data
US 2017/0005841 A1   Jan. 5, 2017

(30) Foreign Application Priority Data
Jul. 2, 2015  (JP) ................. 2015-133287

(51) Int. Cl.
| | | |
|---|---|---|
| H03G 11/04 | (2006.01) | |
| H04L 7/00 | (2006.01) | |
| H04L 25/08 | (2006.01) | |
| H04L 1/06 | (2006.01) | |
| H04L 25/03 | (2006.01) | |

(52) U.S. Cl.
CPC .......... *H04L 7/0058* (2013.01); *H04L 1/0643* (2013.01); *H04L 25/03057* (2013.01); *H04L 25/08* (2013.01)

(58) Field of Classification Search
CPC .. H04L 7/0058; H04L 25/03949; H04L 25/08
USPC ........ 375/232, 233, 346, 348, 350; 708/322, 708/323
See application file for complete search history.

(56) References Cited

U.S. PATENT DOCUMENTS

| | | | |
|---|---|---|---|
| 5,031,195 A * | 7/1991 | Chevillat .......... | H04L 25/03044 375/234 |
| 5,157,690 A * | 10/1992 | Buttle ................ | H03H 21/0012 333/18 |
| 5,274,670 A * | 12/1993 | Serizawa .......... | H04L 25/03038 375/231 |
| 6,243,412 B1 * | 6/2001 | Fukawa ................ | H01Q 1/246 375/219 |

(Continued)

FOREIGN PATENT DOCUMENTS

JP   2011-151765 A   8/2011

OTHER PUBLICATIONS

Adel A. M. Saleh, "Frequency-Independent and Frequency-Dependent Nonlinear Models of TWT Amplifiers", IEEE Transactions on Communications, Nov. 1981, pp. 1715-1720, vol. Com-29, No. 11.

*Primary Examiner* — Daniel Washburn
*Assistant Examiner* — Sarah Hassan
(74) *Attorney, Agent, or Firm* — Mattingly & Malur, PC

(57) ABSTRACT

An equalizer includes a data sampler that samples input data and outputs a time-series data string according to the input data, an arithmetic circuit that multiplies a data string output before reference data in the data string output from the data sampler by a tap coefficient and forms the input data by an arithmetic operation of a multiplication result and an input signal, a tap coefficient calculation circuit that updates the tap coefficient based on a data string output before the reference data, and a determination circuit that receives the reference data and data output after the reference data in the data string and controls presence or absence of update of the tap coefficient performed by the tap coefficient calculation circuit.

20 Claims, 10 Drawing Sheets

(56) References Cited

U.S. PATENT DOCUMENTS

| | | | |
|---|---|---|---|
| 6,940,898 B2* | 9/2005 | Shanbhag | H03H 21/0012 375/229 |
| 7,031,405 B1* | 4/2006 | Touzni | H04L 27/0014 375/233 |
| 2002/0006160 A1* | 1/2002 | Koyama | H03H 21/0012 375/232 |
| 2002/0154247 A1* | 10/2002 | Ghosh | H04L 1/0054 348/614 |
| 2003/0012274 A1* | 1/2003 | Markman | H04N 5/211 375/232 |
| 2004/0071243 A1* | 4/2004 | Agazzi | G01R 31/3004 375/348 |
| 2005/0190832 A1* | 9/2005 | Ibragimov | H03H 21/0012 375/233 |
| 2010/0008414 A1* | 1/2010 | Lee | H04L 25/0307 375/233 |
| 2012/0148266 A1* | 6/2012 | Komaki | H04B 10/611 398/210 |

* cited by examiner

EQUALIZER

BACKGROUND OF THE INVENTION

1. Field of the Invention

The present invention relates to an equalizer, in particular, to a technique for adjusting a waveform equalization coefficient of a decision feedback equalizer.

2. Description of the Related Art

There are many types of equalizers. Among them, there is a decision feedback equalizer (DFE). The decision feedback equalizer is known as one of waveform equalization techniques for compensating transmission loss. In the decision feedback equalizer, adjustment of the waveform equalization coefficient is performed to compensate the transmission loss. As techniques related to the adjustment of the waveform equalization coefficient, for example, techniques described in IEEE Transactions on Communications, Vol. COM-29, No. 11, November 1981 and JP-2011-151765-A are known.

IEEE Transactions on Communications, Vol. COM-29, No. 11, November 1981 describes a technique that adaptively adjusts a filter response by selecting a corresponding filter response from a table in a memory when receiving a transmission signal and performing feedback so as to subtract an output of the selected filter response from a reception signal. JP-2011-151765-A describes a technique that performs filtering so as to equalize the number of occurrences of each bit pattern which a bit string can form.

SUMMARY OF THE INVENTION

Data is serially transmitted between information devices, such as between a server and a router. Along with speeding up these days, the speed of transmitting data (the transmission speed) is also increasing. For example, the transmission speed per transmission line exceeds 10 Gbps. In such a high transmission speed, the loss in the transmission line increases and a bit error rate increases in transmitted data.

To reduce the bit error rate, a waveform loss generated in a transmission line is compensated by an equalizer (a waveform equalizer). In this case, the waveform equalizer is provided in a receiver circuit that receives data propagated in the transmission line and/or a driver circuit that transmits data to the transmission line. As described above, there are many types of waveform equalizers (equalizers). For example, there are a decision feedback equalizer, a feed forward equalizer (FFE), and a continuous time linear equalizer (CTLE).

When the waveform equalizers are provided in a receiver circuit and/or a driver circuit, for example, some types of equalizers are selected from the waveform equalizers described above and the selected equalizers are combined and provided so that effects of these equalizers are exerted.

Among the many types of equalizers described above, the decision feedback equalizer equalizes an effect of a symbol transferred before a symbol to be transmitted, that is, an effect of a post-cursor, of intersymbol interference that is a main component of the waveform loss. On the other hand, the decision feedback equalizer does not equalize an effect of a symbol transferred after a symbol to be transmitted, that is, an effect of a pre-cursor.

Specifically, in the decision feedback equalizer, data of a symbol transferred before a symbol to be transmitted is multiplied by a tap coefficient and data obtained by this multiplication is subtracted from data of the symbol to be transmitted. Thereby, equalization of the effect of the post-cursor is performed. However, equalization of the effect of the pre-cursor is not performed.

On the other hand, in a least mean square (LMS) algorithm used for the decision feedback equalizer, when the tap coefficient is determined, a degree of contribution of each tap tends to be reduced. Therefore, when the effect of the pre-cursor is large, there is a problem that the convergence characteristics of the tap coefficient become unstable.

In IEEE Transactions on Communications, Vol. COM-29, No. 11, November 1981 and JP-2011-151765-A, the effect of the pre-cursor is not recognized.

An object of the present invention is to provide an equalizer that can improve the convergence accuracy of tap coefficient and shorten the convergence time.

Other purposes and new features of the present invention will become clear from the description of the present specification and the accompanying drawings.

The following explains briefly the outline of a typical invention among the inventions disclosed in the present application.

According to an embodiment, an equalizer includes a data sampler, an arithmetic circuit, a tap coefficient calculation circuit, and a determination circuit. Here, the data sampler samples input data and outputs a time-series data string according to the input data. The arithmetic circuit multiplies a data string output before reference data in the data string output from the data sampler by a tap coefficient and forms the input data described above by an arithmetic operation of a multiplication result and an input signal. The tap coefficient calculation circuit updates the tap coefficient based on a data string output before the reference data. The determination circuit receives the reference data and data output after the reference data in the data string and controls the presence or absence of update of the tap coefficient performed by the tap coefficient calculation circuit.

According to another embodiment, an equalizer includes an input buffer that receives an input signal, a decision feedback equalizer including a data sampler and an error sampler, and a tap coefficient calculation circuit that receives a data output from the data sampler and an error output from the error sampler and adaptively calculates a tap coefficient in the decision feedback equalizer. Here, the equalizer includes a filter circuit that receives data of a predetermined one symbol to be reference data in the data output from the data sampler and data one symbol after the predetermined one symbol, and the presence or absence of update of the tap coefficient in the tap coefficient calculation circuit is determined according to a result of the filter circuit.

The presence or absence of update of the tap coefficient is determined by a relationship between a code of the reference data (data of a predetermined one symbol) and a code of data output after the reference data (data output one symbol after the reference data). That is to say, the tap coefficient used when equalizing the reference data is a coefficient where the code of the reference data and the code of data output after the reference data are considered. As a result, it is possible to improve the accuracy (convergence accuracy) of the tap coefficient when the tap coefficient converges. Further, it is possible to shorten a time (a convergence time) required for the convergence.

The following explains briefly the effects obtained by a typical invention among the inventions disclosed in the present application.

Even in a state in which the pre-cursor remains, it is possible to provide an equalizer that can improve the convergence accuracy of tap coefficient and shorten the convergence time.

DESCRIPTION OF THE PREFERRED EMBODIMENTS

Hereinafter, embodiments of the present invention will be described in detail with reference to the drawings. In all the drawings for describing the embodiments, the same portions are denoted by the same reference symbols in principle and repetitive descriptions thereof will be omitted in principle.

First Embodiment

Figure 1:
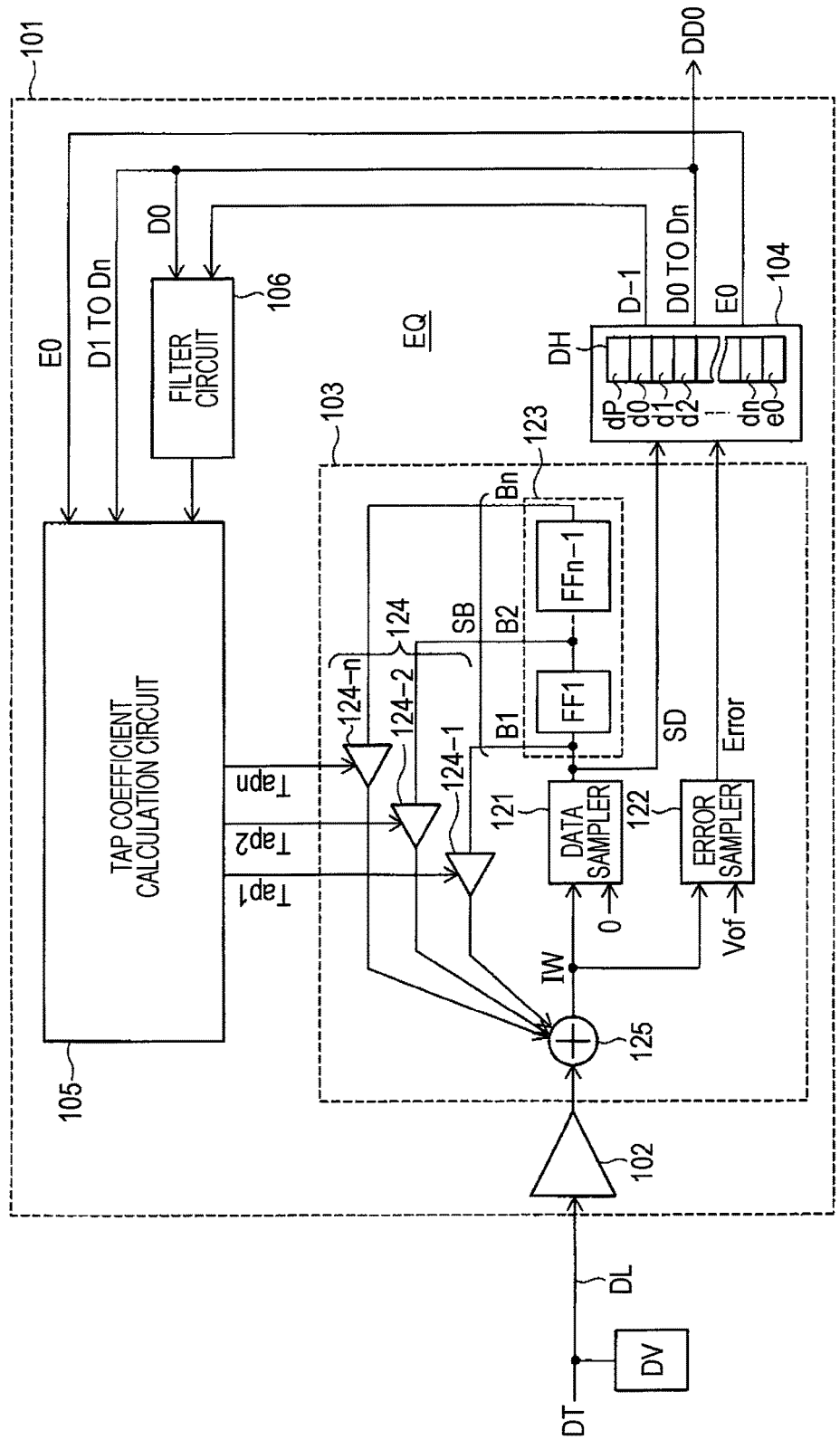
FIG. 1 is a block diagram illustrating a configuration of a receiver circuit according to a first embodiment.

FIG. 1 is a block diagram illustrating a configuration of a receiver circuit according to a first embodiment. In FIG. 1, reference numeral 101 denotes a receiver circuit. The receiver circuit 101 is connected to a transmission line DL, and a driver circuit DV that outputs transmission data DT is connected to the transmission line DL.

The driver circuit DV generates a time-series data string and supplies the data string to the transmission line DL as the transmission data DT. In other words, the driver circuit DV supplies a serial data string (a bit string) to the transmission line DL. The data string supplied to the transmission line DL propagates in the transmission line DL and is supplied to the receiver circuit 101.

At this time, the transmission line DL has a loss, so that a waveform of each data (bit) of the transmission data DT supplied to the receiver circuit 101 is deformed and is further deformed by mutual interference between data. As a result, the waveform of the transmission data DT supplied to the receiver circuit 101 is deformed due to a waveform loss generated by the transmission line DL.

The receiver circuit 101 receives the supplied transmission data DT, equalizes the waveform loss generated by the transmission line DL, and outputs output data DD0 corresponding to the transmission data DT output from the driver circuit DV. Although the receiver circuit 101 includes a plurality of circuits, FIG. 1 illustrates only an input buffer 102 and an equalizer EQ and omits the other circuits.

The equalizer EQ includes a decision feedback equalizer (hereinafter also referred to as a DFE circuit) 103, a demultiplexer 104, a tap coefficient calculation circuit 105 that adaptively calculates a tap coefficient, and a filter circuit 106. For convenience of description, the equalizer EQ includes the circuit block described above in the description. However, the decision feedback equalizer 103 may be assumed to be the equalizer EQ. In this case, the demultiplexer 104, the tap coefficient calculation circuit 105, and the filter circuit 106 may be assumed to be circuits attached to the equalizer EQ.

The transmission data DT is input into the decision feedback equalizer 103 through the input buffer 102. The input buffer 102 is, for example, an equalizer which is different from the decision feedback equalizer. For example, the input buffer 102 is a continuous time linear equalizer or the like. Of course, the input buffer 102 need not be included or may be a buffer that shapes the waveform of the transmission data DT.

The decision feedback equalizer 103 includes a data sampler 121, an error sampler 122, a bit shift circuit 123, a tap coefficient multiplying circuit 124, and a tap adding circuit 125.

The tap coefficient multiplying circuit 124 is composed of a plurality of tap coefficient multipliers 124-1 to 124-$n$, each of which has the same configuration. The tap coefficient multipliers 124-1 to 124-$n$ respectively multiply corresponding output data B1 to Bn (data string SB) from the bit shift circuit 123 by corresponding tap coefficients Tap1 to Tapn. FIG. 1 representatively illustrates the tap coefficient multipliers 124-1, 124-2, and 124-$n$ of the plurality of tap coefficient multipliers included in the tap coefficient multiplying circuit 124. The tap coefficient multiplier 124-1 will be described as an example. The tap coefficient multiplier 124-1 performs multiplication of a corresponding tap coefficient Tap1 and corresponding output data B1 from the bit shift circuit 123. The same goes for the other tap coefficient multipliers 124-2 to 124-$n$.

An output signal from the tap coefficient multiplying circuit 124, that is, an output signal (a multiplication result) of each of the tap coefficient multipliers 124-1 to 124-$n$, is supplied to the tap adding circuit 125. The tap adding circuit 125 uses a signal output from the input buffer 102 as an input signal, performs subtraction between the input signal and the output signal (the multiplication result) from the tap coefficient multiplying circuit 124, and supplies a signal obtained by the subtraction to the data sampler 121 and the error sampler 122 as an input data IW. In the present specification, both subtraction and addition are referred to as addition unless otherwise stated.

Here, the tap coefficient multiplying circuit 124 and the tap adding circuit 125 can be assumed to be an arithmetic circuit that multiplies the output data B1 to Bn of the bit shift circuit 123 by the tap coefficients Tap1 to Tapn, respectively, and adds (subtracts) an output signal (a multiplication result) obtained by the multiplication to (from) an input signal.

The data sampler 121 samples the input data IW output from the tap adding circuit 125, that is, the input data IW output from the arithmetic circuit, in a state in which there is no data offset. In FIG. 1, the offset is indicated as zero to illustrate a state in which there is no data offset. A data output obtained by the sampling of the data sampler 121, that is, a data string SD in FIG. 1, is supplied to the bit shift circuit 123 and the demultiplexer 104. On the other hand, the error sampler 122 samples the input data IW in a state in which the input data IW has a data offset Vof. In other words, the error sampler 122 performs the sampling by comparing the input data IW with reference to the data offset Vof. An error output obtained by the sampling, that is, an error data string Error in FIG. 1, is supplied to the demultiplexer 104 as a result of error sampling.

The bit shift circuit 123 includes a plurality of delay circuits serially connected to each other. In FIG. 1, the plurality of delay circuits are formed of flip-flop circuits (hereinafter also referred to as FF circuits) FF1 to FFn−1. Specifically, the FF circuits FF1 to FFn−1 are serially connected to each other and each of the FF circuits FF1 to FFn−1 takes in data supplied to an input and outputs the data in synchronization with a clock signal not illustrated in FIG. 1. Thereby, each of the FF circuits FF1 to FFn−1 operates as a delay circuit having a delay time according to the frequency of the clock signal. FIG. 1 illustrates only the FF circuits FF1 and FFn−1 and omits the other FF circuits FF2 to FFn−2.

The data string SD is supplied to the input of the FF circuit FF1 included in the bit shift circuit 123, an output from the FF circuit FF1 is supplied to the input of the FF circuit FF2 not illustrated in FIG. 1, and an output from the FF circuit FF2 is supplied to the input of the FF circuit FF3 not illustrated in FIG. 1. The other FF circuits FF3 to FFn−1 are also serially connected to each other in the same manner. An input to the FF circuit FF1 is output as the output data B1 of the bit shift circuit 123, and an output from the FF circuit FF1, that is, an input to the FF circuit FF2 (not illustrated in FIG. 1) is output as the output data B2. Similarly, each input to each of the FF circuits FF3 to FFn−1 is output as output data B3 to Bn−1. Further, an output from the FF circuit FFn−1 is output as the output data Bn of the bit shift circuit 123.

The bit shift circuit 123 receives time-series data string SD from the data sampler 121 and outputs the data string SB composed of the output data B1 to Bn. In this case, the data string SB represents data temporally sequentially output (in the past) from the data sampler 121 in order from the output data B1 to the output data Bn. For example, in the data string SB output from the bit shift circuit 123, the output data B2 represents data output from the data sampler 121 earlier than the output data B1. In the same manner, the output data of the data string represents data temporally sequentially output from the data sampler 121 in order from the output data B3 to the output data Bn.

As described above, the tap coefficient multiplying circuit 124 multiplies the output data B1 to Bn of the bit shift circuit 123 and the tap coefficients Tap1 to Tapn that are corresponding outputs from the tap coefficient calculation circuit 105. The tap adding circuit 125 adds a total sum of the outputs of the tap coefficient multiplying circuit 124 to an input signal of the decision feedback equalizer 103. The configuration of the decision feedback equalizer 103 illustrated in FIG. 1 is an example and the configuration is not limited to this example. For example, the decision feedback equalizer 103 may be a speculative decision feedback equalizer. Further, the frequency of the clock signal that drives the decision feedback equalizer 103, for example, the clock signal to which the FF circuits FF1 to FFn−1 synchronize, may be a half rate or a quarter rate of a reference clock signal.

The data sampler 121 samples the input data IW (without data offset) and outputs the input data IW. Therefore, the data string SD output from the data sampler 121 is a data string composed of serial data D−1 to Dn corresponding to a temporal change of the input data IW, and the data string SD is output serially (in series) from the data sampler 121 to the demultiplexer 104. Similarly, the error sampler 122 samples the input data IW (with data offset Vof) and outputs the error data string Error. Therefore, the error data string Error output from the error sampler 122 is a data string composed of serial error data E−1 to En corresponding to a temporal change of the input data IW, and the error data string Error is output serially (in series) from the error sampler 122 to the demultiplexer 104.

Here, the data sampler 121 and the error sampler 122 perform the sampling in synchronization with each other. Therefore, the data D−1 to Dn that form the data string SD and the error data E−1 to En correspond to each other, respectively. In other words, the data D−1 and the error data E−1 are data that are obtained by sampling the input data IW at the same time, the data D0 and the error data E0 are data that are obtained by sampling the input data IW at the same time, and the data D1 and the error data E1 are data that are obtained by sampling the input data IW at the same time. The same goes for the other data D2 to Dn and the other error data E2 to En.

The data string SD from the data sampler 121 and the error data string Error from the error sampler 122 are outputs from the decision feedback equalizer 103.

The demultiplexer 104 includes a holding circuit DH and converts the data string SD and the error data string Error output from the decision feedback equalizer 103 into parallel data (temporally parallel data), respectively. Specifically, the output data SD of the data sampler 121 is converted into parallel data and becomes parallel data strings (bit strings) formed by the data D−1, D0, and D1 to Dn. Similarly, the error data string Error of the error sampler 122 is converted into parallel data and becomes parallel data strings (bit strings) formed by the data E−1, E0, and E1 to En.

The holding circuit DH included in the demultiplexer 104 includes data holding circuits dp, d0 to dn, and e0. Here, the data holding circuit dp corresponds to the data D−1, and the data holding circuits d0 to dn correspond to the data D0 to Dn, respectively. The data holding circuit e0 corresponds to the error data E0 of the error data string Error. The data D−1 to Dn converted into parallel data are held by corresponding data holding circuits dp and d0 to dn, respectively.

In the error data string Error output from the error sampler 122, error data used in the tap coefficient calculation circuit 105 is only the error data E0 corresponding to the reference data D0 to be equalized. Therefore, only the error data E0 corresponding to the reference data D0 is held by the data holding circuit e0, and the other data E−1 and E1 to En are, for example, not held by the holding circuit DH and they are discarded.

Figure 10:
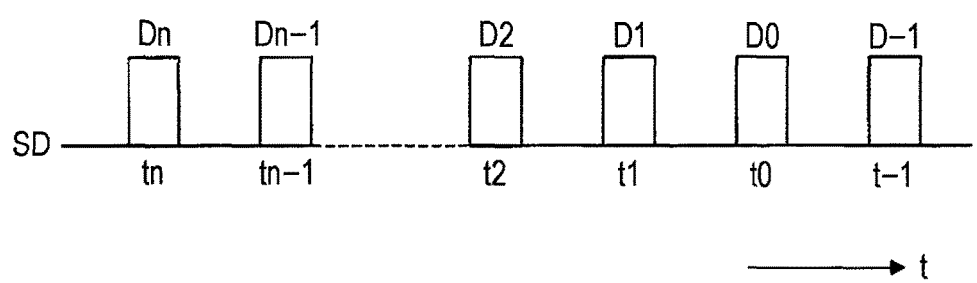
FIG. 10 is a waveform chart illustrating a waveform of output data output from a data sampler.

FIG. 10 is a waveform chart illustrating a waveform of the data string SD (data D−1 to Dn) output from the data sampler 121. In FIG. 10, the horizontal axis represents time and the vertical axis represents a voltage. In FIG. 10, when the time t0 is defined as a reference time, the times t1 to tn represent times before the reference time t0, that is, past times, and the time t−1 represents a time after the reference time t0. For example, the time t1 represents a time before the reference time t0 and the time t2 represents a time before the time t1. The same goes for the times t3 to tn. In FIG. 10, for description purposes, each of the reference data D0 at the reference time t0, the data D1 to Dn at the times t1 to tn before the reference time t0, and the data D−1 at the time t−1 after the reference time t0 represents a state of high level corresponding to, for example, a code of logical value 1. However, the code (logical value) of each of the reference data D0, the data D1 to Dn after the reference data D0, and the data D−1 before the reference data D0 varies according to the value of the input data IW.

The input data IW is according to transfer data supplied from the driver circuit DV (FIG. 1) to the transmission line DL. Therefore, the code of the reference data D0 corresponds to the code of the transfer data supplied to the transmission line DL by the driver circuit DV at a predetermined time (for example, at the reference time t0). The code of the data D1 corresponds to the code of a symbol output by the driver circuit DV one symbol before the reference data D0. Similarly, the code of the data D2 corresponds to the code of a symbol output by the driver circuit DV two symbols before the reference data D0. Similarly, the data Dn corresponds to a symbol n symbols before the reference data D0. On the other hand, the code of the data D−1 corresponds to the code of a symbol output to the transmission line DL by the driver circuit DV one symbol after the reference data D0.

Although not illustrated in FIG. 10, in the same manner as in the data string SD, in the error data string Error output from the error sampler 122, the error data E0 is output from the error sampler 122 at the reference time t0. The error data E1 to En are output from the error sampler 122 at the times t1 to tn, respectively, before the reference time t0, and the error data E−1 is output from the error sampler 122 at the time t−1 after the reference time t0.

A serial bit string (Dn to D−1) supplied from the time t0 to the time t−1 is converted into parallel data, the code (logical value) of the data D−1 is held by the data holding circuit dp, and the data D0 to Dn are held by the data holding circuits d0 to dn. In the error data. E−1 to En that are converted into parallel data, the code of the error data E0 corresponding to the reference data D0 is held by the data holding circuit e0.

Here, output data B1 output from the bit shift circuit 123 corresponds to the data D1 held by the holding circuit DH, and output data B2 output from the bit shift circuit 123 corresponds to the data D2 held by the holding circuit DH. In the same manner, output data B3 to Bn output from the bit shift circuit 123 respectively correspond to the data D3 to Dn held by the holding circuit DH. In FIG. 10, for example, at the time t−1, the data string SD and the error data string Error are converted into parallel data, and the data D−1 to Dn and the error data E0 are held by the holding circuit DH. On the other hand, the output data B1 to Bn corresponding to the data D1 to Dn are output from the bit shift circuit 123.

The data string (the data D−1 to Dn) held by the holding circuit DH and the error data E0 are output from the demultiplexer 104. The output from the demultiplexer 104 is supplied to the tap coefficient calculation circuit 105 and the filter circuit 106. The reference data D0 is output as an output DD0 of the receiver circuit 101.

In the first embodiment, the data D1 to Dn and the error data E0 in the bit string from the demultiplexer 104 are supplied to the tap coefficient calculation circuit 105. The reference data D0 and the data D−1 one symbol after the reference data D0 are supplied to the filter circuit 106. Although the filter circuit 106 will be described later with reference to FIG. 4, the filter circuit 106 controls the presence or absence of update of the tap coefficients Tap1 to Tapn in the tap coefficient calculation circuit 105 based on the code of each of the reference data D0 and the data D−1 one symbol after the reference data D0. The filter circuit 106 determines the presence or absence of update of the tap coefficients Tap1 to Tapn, so that the filter circuit 106 can be assumed to be a determination circuit.

When the update of the tap coefficients Tap1 to Tapn is set to be effective (allowed) by the filter circuit 106, the tap coefficient calculation circuit 105 updates the tap coefficients Tap1 to Tapn based on the data D1 to Dn and the error data E0 from the demultiplexer 104. On the other hand, when the update of the tap coefficients Tap1 to Tapn is prohibited by the filter circuit 106, the tap coefficient calculation circuit 105 does not update the tap coefficients Tap1 to Tapn. The update of the tap coefficients Tap1 to Tapn includes a case in which the values of the tap coefficients are increased and a case in which the values of the tap coefficients are decreased.

In the first embodiment, the tap coefficient calculation circuit 105 performs calculation (update) of the tap coefficient on the reference data D0 by using data (D1 to Dn) of symbols before the reference data D0, and the data string (B1 to Bn) before the reference data D0 is multiplied by the tap coefficient. Then, the presence or absence of the calculation (update) of the tap coefficient is controlled based on the reference data D0 and the data D−1 of a symbol after the reference data D0. In an example of FIG. 4 described later, when the code of the reference data D0 and the code of the data D−1 one symbol after the reference data D0 are coincident with each other, the calculation (update) of the tap coefficient in the tap coefficient calculation circuit 105 is allowed by the filter circuit 106. On the other hand, when the code of the reference data D0 and the code of the data D−1 one symbol after the reference data D0 are not coincident with each other, the calculation (update) of the tap coefficient in the tap coefficient calculation circuit 105 is prohibited by the filter circuit 106.

The receiver circuit 101 sequentially receives data from the driver circuit DV, so that data held in the holding circuit DH in the demultiplexer 104 varies sequentially. When the receiver circuit 101 receives data, for example, the data D0 held by the data holding circuit d0 is held as D1 by the data holding circuit d1, the data D−1 held by the data holding circuit dp is held as the reference data D0 by the data holding circuit d0, and the code of the next symbol is held by the data holding circuit dp. Thereby, the receiver circuit 101 outputs the reference data D0, which is equalized by using the received data as the reference data D0, as DD0.

In this way, the calculation of the tap coefficient in the tap coefficient calculation circuit 105 is controlled based on the reference data D0 and the data D−1 one symbol after the reference data D0, so that it is possible to improve the convergence accuracy of the tap coefficient and shorten the convergence time. This will be described with reference to FIGS. 2A to 2C and 3.

Figure 2A:
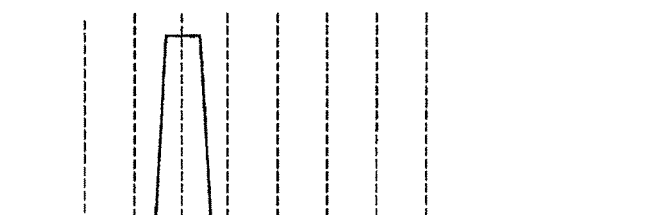
FIGS. 2A to 2C are waveform charts schematically illustrating an operation of a decision feedback equalizer.
Figure 2B:
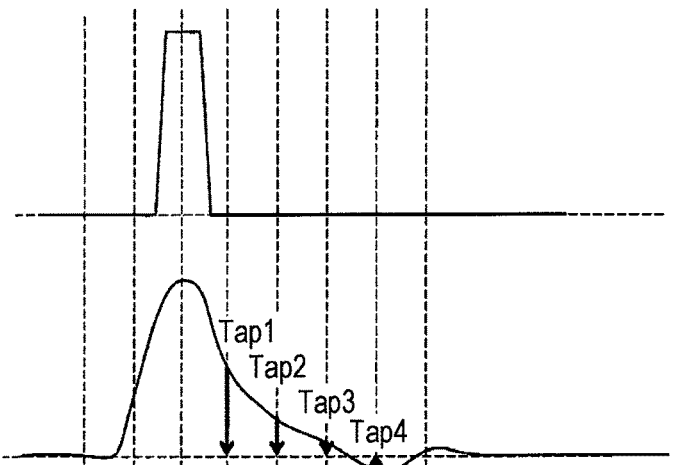
Figure 2C:
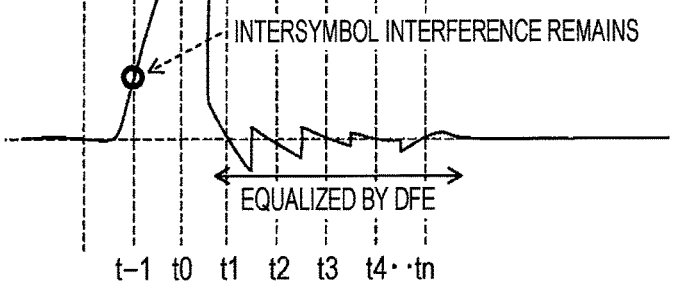

FIGS. 2A to 2C are waveform charts schematically illustrating an operation of the decision feedback equalizer (DFE circuit) 103. FIG. 2A illustrates a waveform (transfer terminal waveform) supplied to the transmission line DL by the driver circuit DV (FIG. 1). FIG. 2B illustrates a waveform (DFE circuit input waveform) when the waveform illustrated in FIG. 2A reaches the DFE circuit 103 through the transmission line DL (FIG. 1) and the input buffer 102. FIG. 2C illustrates an output waveform of the DFE circuit 103 (DFE circuit equalization waveform). In FIGS. 2A to 2C, the vertical axis represents a voltage and the horizontal axis represents time. Here, different from FIG. 10 described above, FIGS. 2A to 2C show the times t1 to t0 before the time t0 on the right side of the time t0 and shows the time t−1 after the time t0 on the left side of the time t0.

For ease of description, FIG. 2A illustrates a waveform in a case where the driver circuit DV supplies, for example, the reference data D0 of logical value 1 to the transmission line DL at around the time t0. FIGS. 2B and 2C illustrate a waveform generated by an isolated bit response in the transmission line DL when the reference data D0 shown in FIG. 2A is supplied by the transmission line DL.

The waveform of the reference data D0 supplied to the transmission line DL is deformed so that the bottom of the waveform becomes wider due to a loss caused by the transmission line DL. At the times t1 to t4, waveforms of the other data supplied from the driver circuit DV to the transmission line DL are also deformed. Due to the effects of the deformed waveforms of the other data, the waveform of the reference data D0 supplied to the transmission line DL at around the time t0 is deformed as shown at the times t1 to t4 in FIG. 2B. Further, while the data D-1 is supplied from the driver circuit DV at the time t-1, the waveform of the data D-1 is also deformed by a loss of the transmission line DL. Therefore, due to the effects of the deformed waveform of the data D-1, the waveform of the reference data D0 is deformed as shown at the time t-1 in FIG. 2B.

In the decision feedback equalizer 103, the equalization is performed on the reference data D0 based on data of a time before the reference data D0. Specifically, the data D1 to D4 obtained by the sampling of the data sampler 121 at each time t1 to t4 before (prior to) the time t0 are supplied to the tap coefficient multiplying circuit 124 as the output data B1 to B4 from the bit shift circuit 123. In the tap coefficient multiplying circuit 124, the output data B1 to B4 are multiplied by the tap coefficients Tap1 to Tap4, and the multiplication result obtained by the tap coefficient multiplying circuit 124 is subtracted from the input signal of the DFE circuit 103 in the tap adding circuit 125.

In this way, the subtraction is performed in the tap adding circuit 125, so that as illustrated in FIG. 2C, the waveform of the reference data D0 before the time t0 (at the times t1 to t4) is equalized by the DFE circuit. Therefore, it is possible to reduce the intersymbol interference generated by the symbols before the reference data D0. That is to say, the decision feedback equalizer 103 is a circuit that multiplies data sampled in the past by the tap coefficient and feeds back the product of the multiplication to the waveform of the data D0.

The data sampler 121 samples the waveform of the reference data D0 at the time t0, so that the code of the data received by the receiver circuit 101 is fixed.

The decision feedback equalizer 103 uses data sampled in the past, so that it is difficult to equalize the effects of the intersymbol interference caused by the symbols after the reference data D0. Therefore, interference remains in the waveform of the reference data D0.

In particular, when the tap coefficients Tap1 to Tapn are determined by using the least mean square (LMS) algorithm, if the intersymbol interference due to data after one symbol is large, convergence property is degraded. In a transmission path that causes large loss, the intersymbol interference due to data after one symbol is also large, so that the transmission path is easily affected by the convergence property of the tap coefficients. Therefore, it is possible to improve the convergence property of the tap coefficients Tap1 to Tapn and shorten the convergence time by inserting the filter circuit 106.

Figure 3:
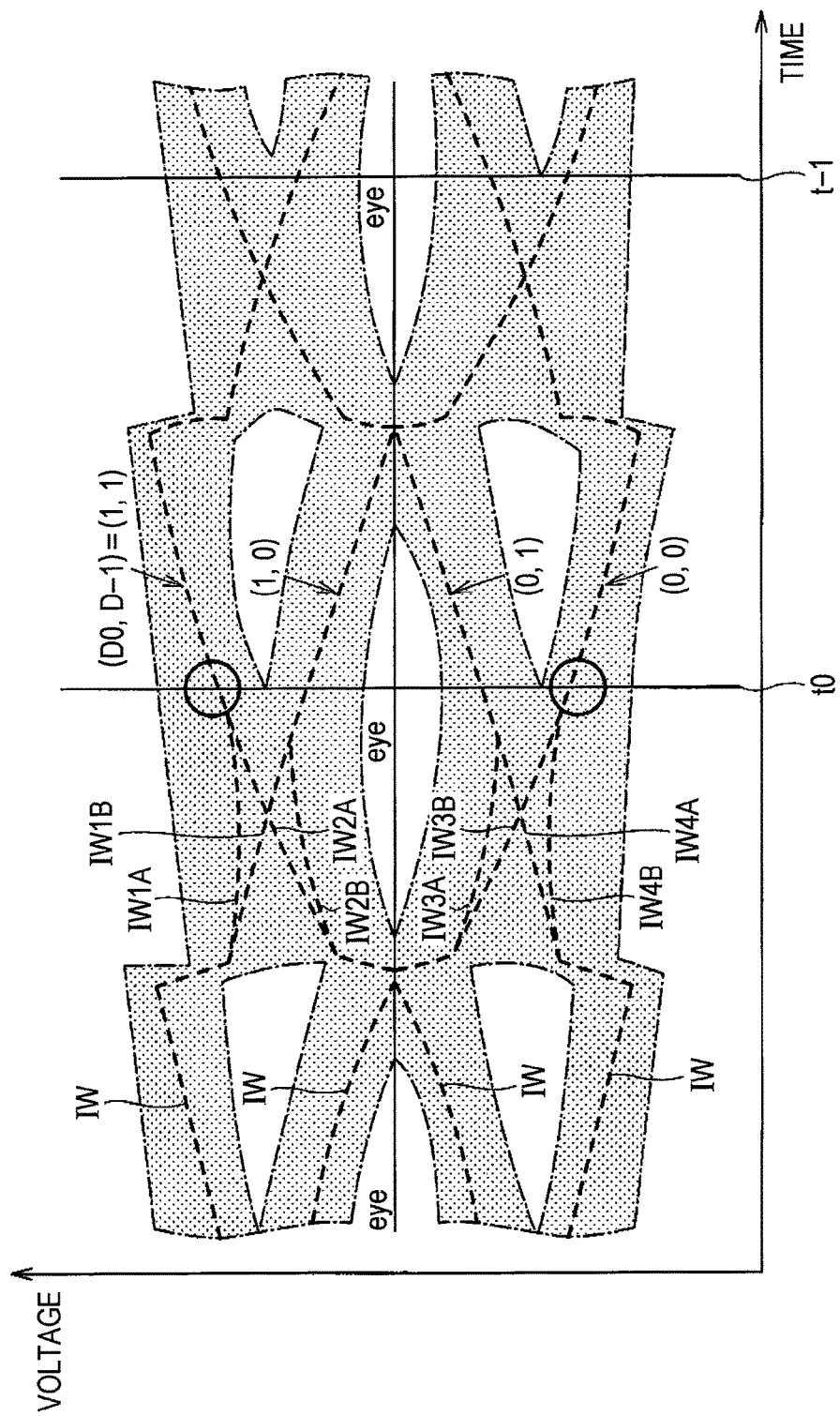
FIG. 3 is a waveform chart illustrating a waveform of input data output from a tap adding circuit according to the first embodiment.

The equalizer will be described in further detail with reference to FIG. 3. FIG. 3 is a waveform chart illustrating a waveform of the input data IW that is an output of the tap adding circuit 125 illustrated in FIG. 1. In FIG. 3, the vertical axis represents a voltage and the horizontal axis represents time. FIG. 3 illustrates temporally overlapped waveforms of the input data IW when an input signal from the input buffer 102 is supplied to the decision feedback equalizer 103 and equalization is repetitively performed. In other words, FIG. 3 illustrates a so-called eye pattern of the input data IW. The tap coefficients Tap1 to Tapn change during the equalization, so that the value subtracted by the tap adding circuit 125 changes. Therefore, the waveform of the input data IW changes and passes through the inside of an area indicated by dots. When the values of the tap coefficients Tap1 to Tapn come close to an ideal value obtained by, for example, calculation, the area indicated by dots is reduced and the area indicated as eye in FIG. 3 is increased. When the so-called eye is expanded and the tap coefficients Tap1 to Tapn reach the ideal value, the area indicated by dots is represented by a line.

In FIG. 3, t0 indicates a time (the reference time) when the data sampler 121 and the error sampler 122 sample the reference data D0 and t-1 indicates a time when the data sampler 121 and the error sampler 122 sample the data D-1 one symbol after the reference data D0. When the time t0 is defined as a reference, the time t-1 is temporally after the time t0. Although not illustrated in FIG. 3, there is the time t1 before the time t0 on the left side of the time t0. At the time t1, the data D1 one symbol before the reference data D0 is sampled.

In FIG. 3, each of dashed lines IW, IW1A to IW4A, and IW1B to IW4B represents an example of waveform of the input data IW. The input data IW changes as shown by the dashed line IW at the time t1 (not shown in FIG. 3) and, at around the time t0, the input data IW changes as shown by any one of the dashed lines IW1A to IW4A and IW1B to IW4B according to a code (a logical value) of each of the reference data D0 and the data D-1 one symbol after the reference data D0.

For example, when the code of the data D0 is 1, the input data IW changes as shown by the dashed line IW1 (generic name of the dashed lines IW1A and IW1B) or IW2 (generic name of the dashed lines IW2A and IW2B), and when the code of the data D0 is 0, the input data IW changes as shown by the dashed line IW3 (generic name of the dashed lines IW3A and IW3B) or IW4 (generic name of the dashed lines IW4A and IW4B). Further, the input data IW changes as shown by the dashed lines where a code A or a code B is attached to the codes IW1 to IW4 according to the code of the data D-1 one symbol after the reference data D0. In other words, when the code of the data D-1 is 1, the input data IW changes as shown by the dashed lines to which the code A is given (IW1A to IW4A), and when the code of the data D-1 is 0, the input data IW changes as shown by the dashed lines to which the code B is given (IW1B to IW4B).

When the code (logical value) of the data D0 is 1 and the code of the data D-1 is 1, the input data IW changes at around the time t0 as shown by the dashed line to which the code IW1A or IW2A is given, and when the code (logical value) of the data D0 is 1 and the code of the data D-1 is 0, the input data IW changes at around the time t0 as shown by the dashed line to which the code IW1B or IW2B is given. Similarly, when the code (logical value) of the data D0 is 0 and the code of the data D-1 is 1, the input data IW changes at around the time t0 as shown by the dashed line to which the code IW3A or IW4A is given, and when the code (logical value) of the data D0 is 0 and the code of the data D-1 is 0, the input data IW changes at around the time t0 as shown by the dashed line to which the code IW3B or IW4B is given.

In this way, the waveform of the input data IW changes due to the effect of the data D-1 after one symbol at the time t0 at which the reference data D0 is sampled. For example, when the code of the reference data D0 is 1, the waveform of the input data IW changes as shown by the dashed line IW1A (IW2A) or the dashed line IW1B (IW2B) depending on the code of the data D−1 after one symbol. Therefore, the voltage of the input data IW becomes a different value depending on the code of the data D−1 after one symbol at the time t0 at which the reference data D0 is sampled. When the code of the reference data D0 is 0, in the same manner, the voltage of the input data IW becomes a different value depending on the code of the data D−1 at the time t0 at which the reference data D0 is sampled. In other words, as illustrated in FIGS. 2A to 2C, the intersymbol interference due to the data D−1 after one symbol occurs.

To cause the tap coefficients Tap1 to Tapn to come close to an ideal value and to enlarge the eye, for example, it is required to identify whether the input data IW changes as shown by the dashed line IW1A or changes as shown by the dashed line IW1B at the time t0. It is possible to perform the above identification by, for example, setting the data offset Vof supplied to the error sampler 122 to a value between the voltage indicated by the dashed line IW1A and the voltage indicated by the dashed line IW1B. However, in this case, it is required to set an appropriate value to the data offset Vof to be supplied to the error sampler 122, and also a time t0 to perform the identification is required. Therefore, a time t0 to cause the tap coefficients Tap1 to Tapn to come close to an ideal value, that is to say, the convergence time of the tap coefficients Tap1 to Tapn, increases.

Further, for example, either one of the tap coefficient corresponding to the dashed line IW1A and the tap coefficient corresponding to the dashed line IW1B is obtained, so that a tap coefficient far different from an ideal value may be obtained. Therefore, it is considered that the accuracy of the obtained tap coefficient degrades.

FIG. 3 illustrates a combination of the codes of the reference data D0 and the data D−1 as (D0, D−1). For example, the dashed line to which the code IW1A is given indicates a case of a combination (1, 1).

In the first embodiment, when the code of the reference data D0 and the code of the data D−1 after one symbol are coincident with each other, the update of the tap coefficients Tap1 to Tapn is allowed, and when these codes are not coincident with each other, the update of the tap coefficients Tap1 to Tapn is prohibited. Thereby, the input data IW illustrated in FIG. 3 changes as illustrated by the dashed line IW1A, IW2A, IW3B, or IW4B and does not change as illustrated by the dashed lines IW1B, IW2B, IW3A, and IW4A. In other words, the input data IW is allowed to change along a waveform (the dashed line IW1A, IW2A, IW3B, or IW4B) curve of when these codes are coincident with each other (the combination is 1, 1 or 0, 0) and is prohibited to change along a waveform (the dashed line IW1B, IW2B, IW3A, or IW4A) curve of when these codes are not coincident with each other (the combination is 1, 0 or 0, 1). In FIG. 3, a circle mark indicates that the input data IW that changes as illustrated by the dashed line IW1A, IW2A, IW3B, or IW4B is sampled at the time t0 to obtain the reference data D0. In this case, the value of the data offset Vof supplied to the error sampler 122 may be a voltage value of the dashed line IW1A, IW2A, IW3B, or IW4B. For example, when the input data IW changes as illustrated by the dashed line IW1A or IW2A, the voltage of the dashed line IW1A at the time t0 may be used as the value of the data offset Vof.

Thereby, it is possible to reduce the time to perform the identification, so that it is possible to shorten the convergence time. When the input data IW changes as illustrated by the dashed line IW1A, IW2A, IW3B, or IW4B due to, for example, the intersymbol interference caused by the loss of the transmission line DL and/or the communication speed, it is possible to accurately obtain a tap coefficient close to an ideal tap coefficient.

Figure 4:
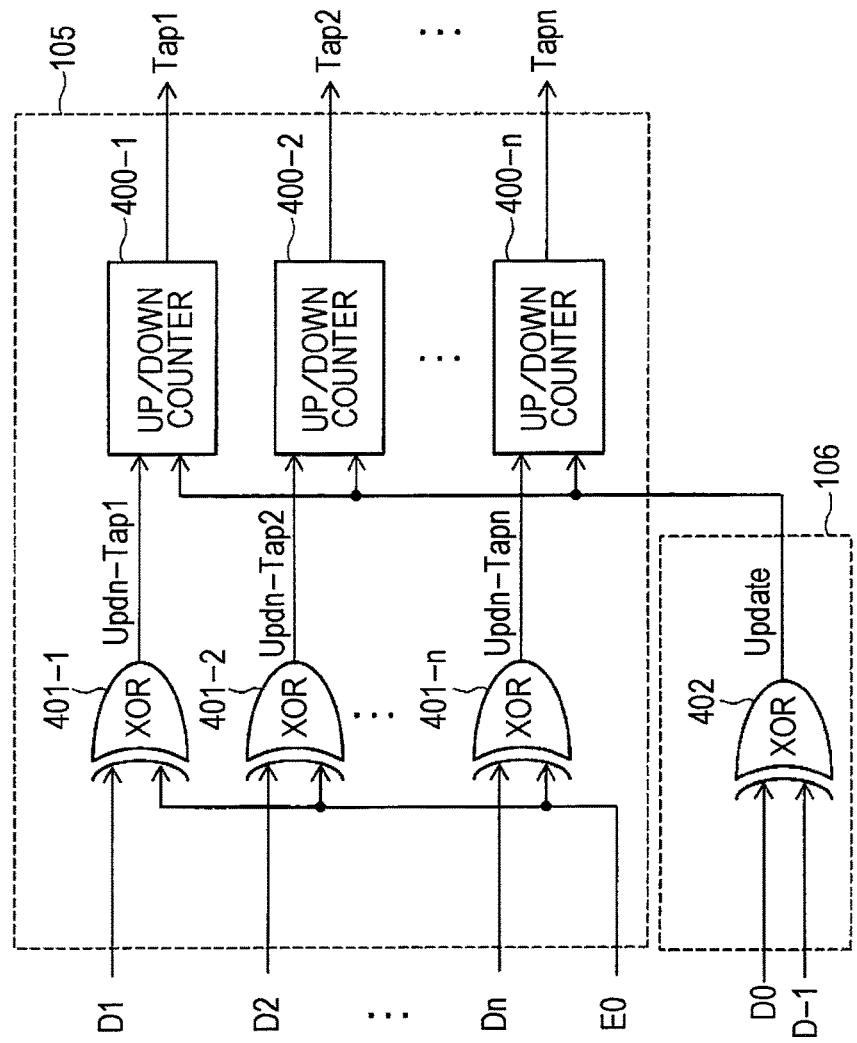
FIG. 4 is a block diagram illustrating configurations of a tap coefficient calculation circuit and a filter circuit according to the first embodiment.

Next, configurations of the tap coefficient calculation circuit 105 and the filter circuit 106 illustrated in FIG. 1 will be described. FIG. 4 is a block diagram illustrating the configurations of the tap coefficient calculation circuit 105 and the filter circuit 106 according to the first embodiment.

The tap coefficient calculation circuit 105 includes two-input exclusive OR circuits 401-1 to 401-$n$ corresponding to the data D1 to Dn and up/down counters 400-1 to 400-$n$ corresponding to the data D1 to Dn. Each of the data D1 to Dn from the demultiplexer 104 (FIG. 1) is supplied to one input of the exclusive OR circuits 401-1 to 401-$n$ and the error data E0 from the demultiplexer 104 is commonly supplied to the other input of the exclusive OR circuits 401-1 to 401-$n$. Outputs of the exclusive OR circuits 401-1 to 401-$n$, to which data corresponding the up/down counters 400-1 to 400-$n$ are supplied, are supplied to the up/down counters 400-1 to 400-$n$ as up/down signals Updn-Tap1 to Updn-Tapn. Further, an update control signal Update that controls update is supplied to the up/down counters 400-1 to 400-$n$ from the filter circuit 106.

Each of the up/down counters 400-1 to 400-$n$ is enabled to perform an up/down operation when the update control signal Update from the filter circuit 106 is low level (logical value 0) and is prohibited to perform an up/down operation when the update control signal Update from the filter circuit 106 is high level (logical value 1). Count values of the up/down counters 400-1 to 400-$n$ are supplied to the corresponding tap coefficient multipliers 124-1 to 124-$n$ (FIG. 1) as the tap coefficients Tap1 to Tapn.

Each of the exclusive OR circuits 401-1 to 401-$n$ performs an exclusive OR operation between the supplied error data E0 and the data D1 to Dn and outputs the operation result as the up/down signals Updn-Tap1 to Updn-Tapn. When the update control signal Update is a logical value 0, each of the up/down counters 400-1 to 400-$n$ increments or decrements the count value according to the up/down signals Updn-Tap1 to Updn-Tapn.

On the other hand, when the update control signal Update is a logical value 1, each of the up/down counters 400-1 to 400-$n$ does not increment or decrement the count value regardless of the up/down signals Updn-Tap1 to Updn-Tapn. Therefore, the count values that are maintained without being incremented or decremented are supplied to the tap coefficient multipliers 124-1 to 124-$n$ as the tap coefficients Tap1 to Tapn.

The filter circuit 106 includes a two-input exclusive OR circuit 402 that receives the reference data D0 and the data D−1 after one symbol from the demultiplexer 104. The exclusive OR circuit 402 performs an exclusive OR operation between the reference data D0 and the data D−1. The result of the exclusive OR operation is output to the filter circuit 106 as the update control signal Update. Therefore, when the logical value of the reference data D0 and the logical value of the data D−1 after one symbol are coincident with each other, the logical value of the update control signal Update becomes 0, and when these logical values are not coincident with each other, the logical value of the update control signal Update becomes 1.

Thereby, when codes (logical values) are coincident with each other between the reference data D0 and the data D−1 one symbol after the reference data D0, the tap coefficient calculation circuit 105 updates the tap coefficients Tap1 to Tapn. In this case, each of the tap coefficients Tap1 to Tapn is incremented or decremented according to a result of an exclusive OR operation between the codes (logical values) of the data D1 to Dn of symbols before the reference data D0 and the code (logical value) of the error data E0, so that the update is performed. On the other hand, when the codes (logical values) are not coincident with each other between the reference data D0 and the data D−1 one symbol after the reference data D0, each of the tap coefficients Tap1 to Tapn is not updated but maintained.

MODIFIED EXAMPLE

Figure 5:
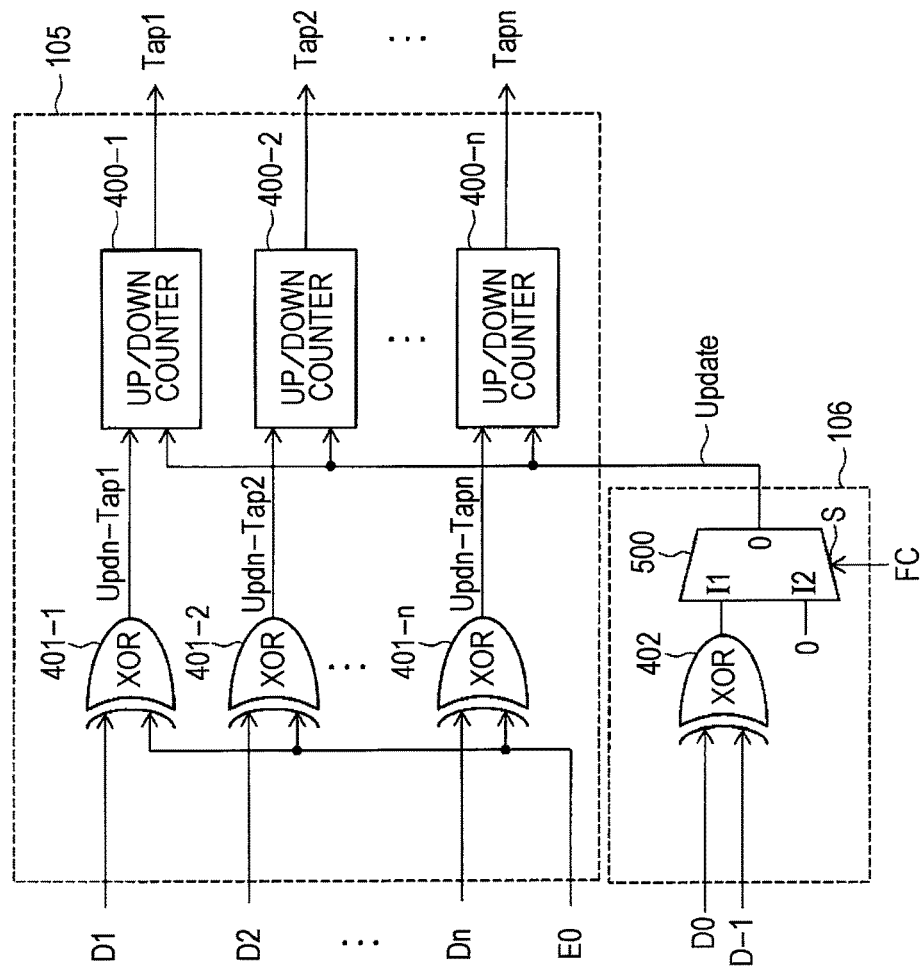
FIG. 5 is a block diagram illustrating a configuration of a filter circuit according to a modified example of the first embodiment.

FIG. 5 is a block diagram illustrating a configuration of a filter circuit according to a modified example of the first embodiment. FIG. 5 illustrates a configuration of a tap coefficient calculation circuit 105 in addition to the filter circuit according to the modified example. However, the configuration of the tap coefficient calculation circuit 105 is the same as that of the tap coefficient calculation circuit 105 illustrated in FIG. 4, so that the description thereof will be omitted.

The filter circuit 106 according to the modified example includes an exclusive OR circuit 402 that receives the reference data D0 and the data D−1 one symbol after the reference data D0 and a selector 500. The selector 500 includes two input terminals I1 and I2, a selection terminal S, and an output terminal O. The output of the exclusive OR circuit 402 is supplied to the input terminal I1 of the selector 500, and a logical value 0 (low level) is supplied to the input terminal I2. The update control signal Update is output from the output terminal O of the selector 500.

Although not limited in particular, a filter enable signal FC is supplied to the selection terminal S from a control circuit (not illustrated in FIG. 5) provided outside the receiver circuit 101 (FIG. 1). When the filter enable signal FC is, for example, high level (logical value 1), the selector 500 transmits the output of the exclusive OR circuit 402 which is supplied to the input terminal I1 to the output terminal O. On the other hand, when the filter enable signal FC is low level (logical value 0), the selector 500 transmits the logical value 0 (low level) which is supplied to the input terminal I2 to the output terminal O.

When the filter enable signal FC is set to a high level by a control circuit not illustrated in FIG. 5, the output of the exclusive OR circuit 402 is supplied to the tap coefficient calculation circuit 105 as the update control signal Update through the selector 500. In this case, in the same manner as the description of FIG. 4, when the code of the reference data D0 and the code of the data D−1 are coincident with each other, the update of the tap coefficients is allowed, and when these codes are not coincident with each other, the update of the tap coefficients is prohibited.

On the other hand, when the filter enable signal FC is set to a low level by the control circuit not illustrated in FIG. 5, the selector 500 outputs a logical value 0 as the update control signal Update. Therefore, regardless of the codes (logical values) of the reference data D0 and the data D−1, the up/down counters 400-1 to 400-n updates (increments or decrements) the count values according to the up/down signals Updn-Tap1 to Updn-Tapn. In other words, the function of the filter circuit 106 is disabled.

It is considered that the effect of the intersymbol interference generated by the data D−1 one symbol after the reference data D0 changes due to the loss of the transmission line DL and/or the communication speed. Therefore, it is considered that the effectiveness of prohibiting the update of the tap coefficients Tap1 to Tapn changes. In this modified example, when the effectiveness is low, the filter enable signal FC is set to a low level by a control circuit. Thereby, the tap coefficients are updated at all times based on the data D1 to Dn and the error data E0.

As a result, it is possible to provide an equalizer according to a transmission line and/or a communication speed.

Second Embodiment

Figure 6:
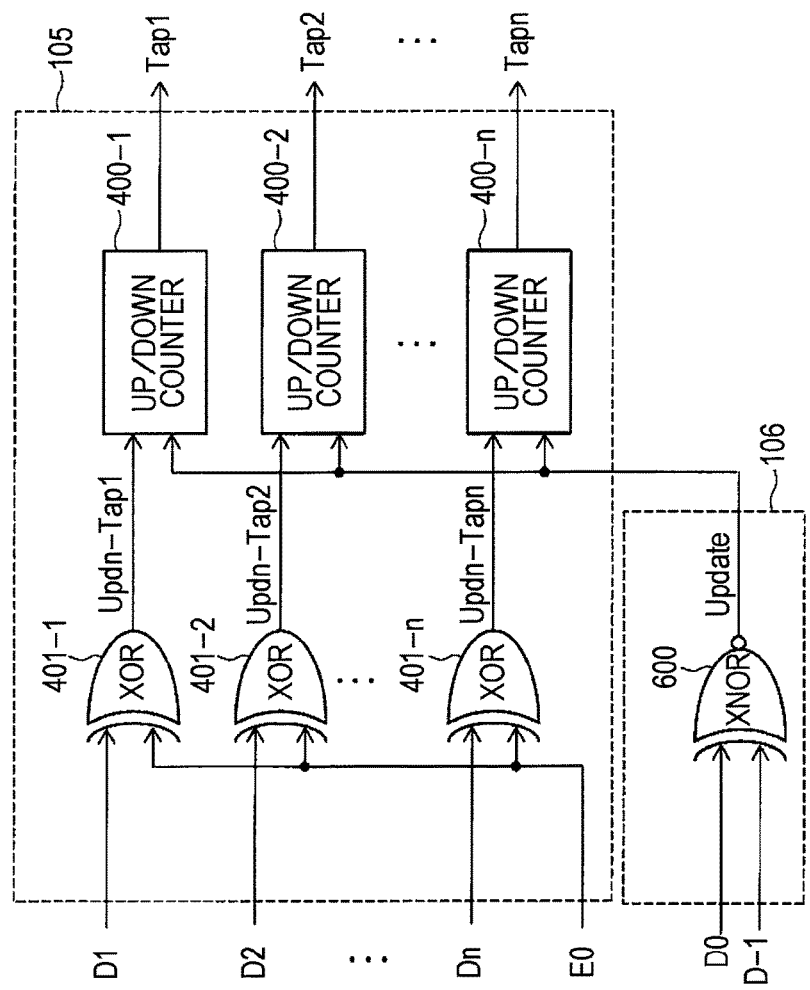
FIG. 6 is a block diagram illustrating a configuration of a filter circuit according to a second embodiment.

FIG. 6 is a block diagram illustrating a configuration of a filter circuit 106 according to a second embodiment. FIG. 6 also illustrates a configuration of a tap coefficient calculation circuit 105 in addition to the filter circuit 106. The configuration of the tap coefficient calculation circuit 105 illustrated in FIG. 6 is the same as that of the tap coefficient calculation circuit 105 illustrated in FIG. 4, so that the description thereof will be omitted.

In the second embodiment, the configuration of the filter circuit 106 is different from that in FIG. 4. In the second embodiment, the filter circuit 106 includes an exclusive NOR circuit 600 that receives the reference data D0 and the data D−1 one symbol after the reference data D0. When the code (logical value) of the reference data D0 and the code (logical value) of the data D−1 after one symbol are not coincident with each other, the exclusive NOR circuit 600 outputs the update control signal Update of a low level (logical value 0), and when these codes are coincident with each other, the exclusive NOR circuit 600 outputs the update control signal Update of a high level (logical value 1).

Therefore, when the code of the reference data D0 and the code of the data D−1 after one symbol are not coincident with each other, each of the up/down counters 400-1 to 400-n is incremented or decremented according to the up/down signals Updn-Tap1 to Updn-Tapn. The incremented or decremented count values are output from the tap coefficient calculation circuit 105 as the tap coefficients Tap1 to Tapn.

Figure 7:
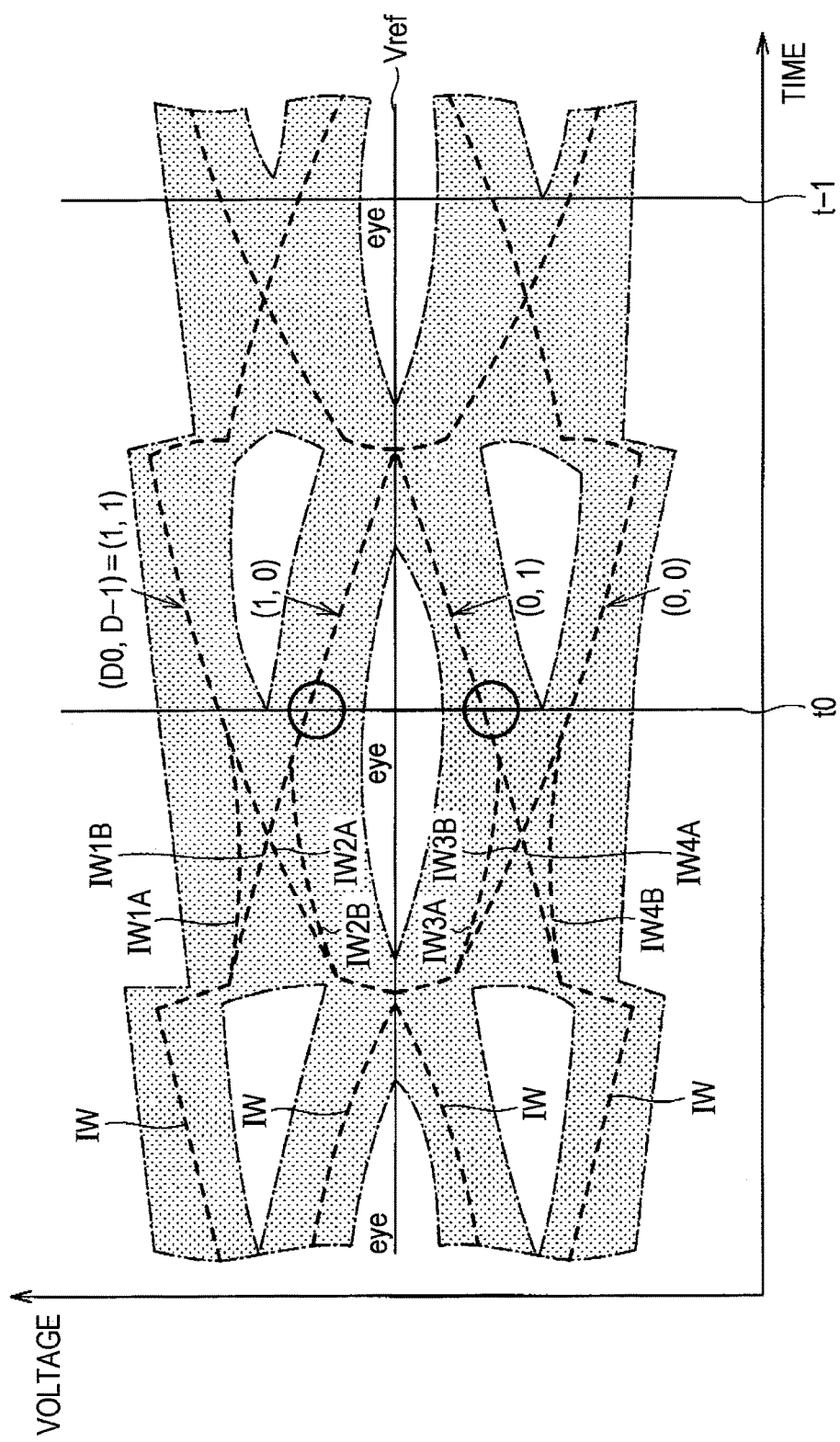
FIG. 7 is a waveform chart illustrating a waveform of input data output from a tap adding circuit according to the second embodiment.

FIG. 7 is a waveform chart illustrating a waveform of input data output from a tap adding circuit 125 according to the second embodiment. FIG. 7 illustrates a waveform illustrating a waveform of the input data IW in the same manner as the waveform chart illustrated in FIG. 3. In other words, FIG. 7 illustrates an eye pattern of the input data IW. Different from the first embodiment, in the second embodiment, when the code of the reference data D0 and the code of the data D−1 after one symbol are not coincident with each other, the update of the tap coefficients Tap1 to Tapn is performed. Therefore, the input data IW changes as illustrated by the dashed line IW1B, IW2B, IW3A, or IW4A. In this case, the data sampler 121 and the error sampler 122 sample the input data IW at the time t0 which is the sampling timing of the reference data D0. At this time, the waveform of the input data IW to be sampled changes as illustrated by any one of the dashed lines IW1B, IW2B, IW3A, and IW4A, so that the sampling is performed at a part indicated by a circle mark.

In the same manner as in the first embodiment, it is possible to shorten the time required to perform the identification, so that it is possible to shorten the convergence time. Further, when the input data IW changes as illustrated by the dashed line IW1B, IW2B, IW3A, or IW4A due to the intersymbol interference caused by the loss of the transmission line DL and/or the communication speed, it is possible to accurately obtain a tap coefficient close to an ideal tap coefficient.

The value of the data offset Vof supplied to the error sampler 122 at the time t0 may be a voltage of the dashed line IW1A, IW2A, IW3B, or IW4B at the time t0. When the voltage value of the data offset Vof is a potential with respect to a reference voltage Vref illustrated in FIG. 7, the voltage value of the data offset Vof may be smaller than that in the first embodiment. Therefore, a voltage range used for comparison when the error sampler 122 performs the sampling can be smaller than that in the first embodiment.

Third Embodiment

Figure 8:
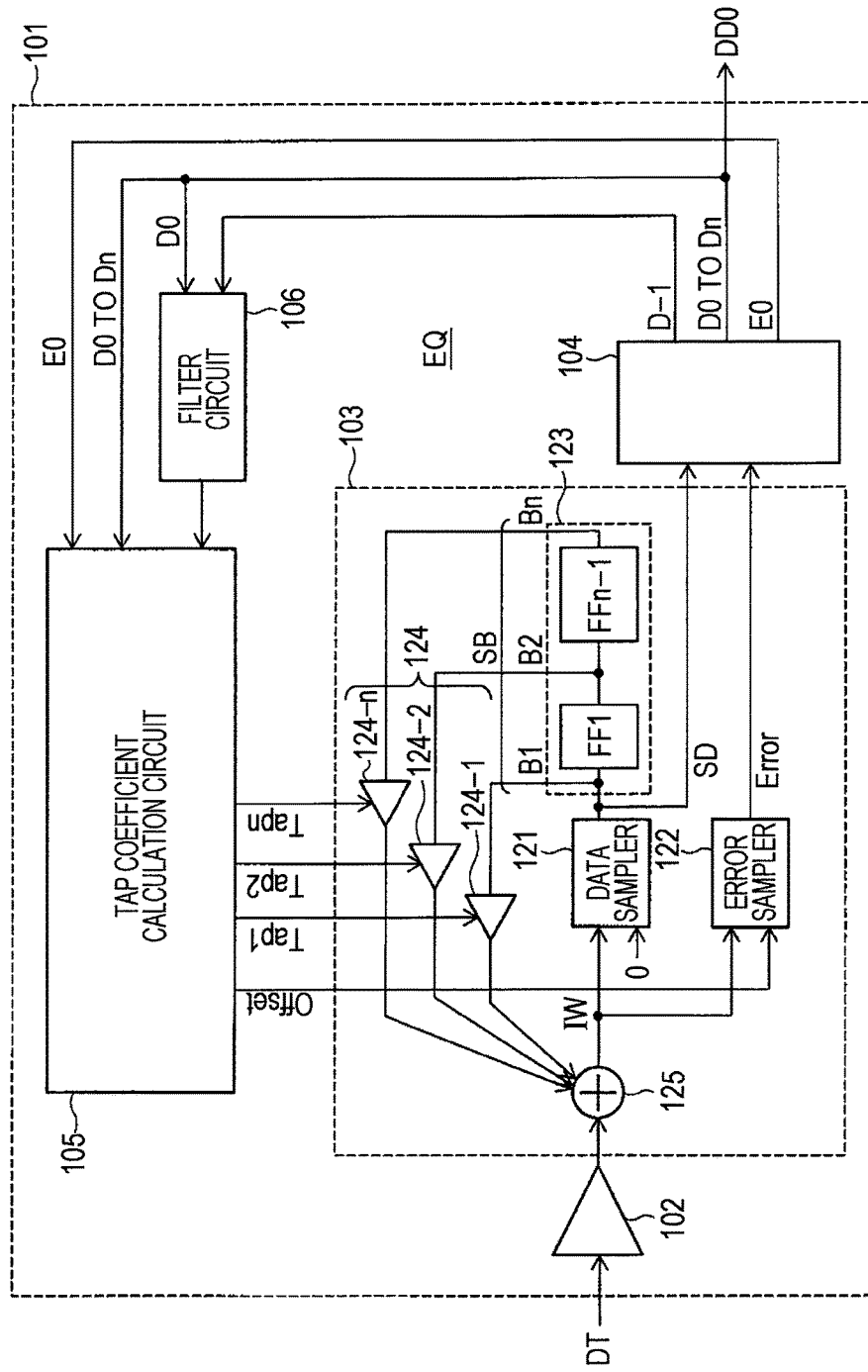
FIG. 8 is a block diagram illustrating a configuration of a receiver circuit according to a third embodiment.

FIG. 8 is a block diagram illustrating a configuration of a receiver circuit according to a third embodiment. The configuration of the receiver circuit 101 illustrated in FIG. 8 is similar to the configuration of the receiver illustrated in FIG. 1. Here, differences from the receiver circuit illustrated in FIG. 1 will be mainly described. In FIG. 8, the holding circuit DH, the driver circuit DV, and the transmission line DL which are illustrated in FIG. 1 are omitted.

In the receiver circuit 101 illustrated in FIG. 8, the tap coefficient calculation circuit 105 forms an offset coefficient Offset to be supplied to the error sampler 122. The error sampler 122 uses the offset coefficient Offset formed by the tap coefficient calculation circuit 105 as the data offset Vof and samples the input data IW based on the data offset.

In the third embodiment, the tap coefficient calculation circuit 105 uses the reference data D0 and the error data E0 to form the offset coefficient Offset. Therefore, the reference data D0 is also supplied to the tap coefficient calculation circuit 105 as compared with the tap coefficient calculation circuit illustrated in FIG. 1.

Figure 9:
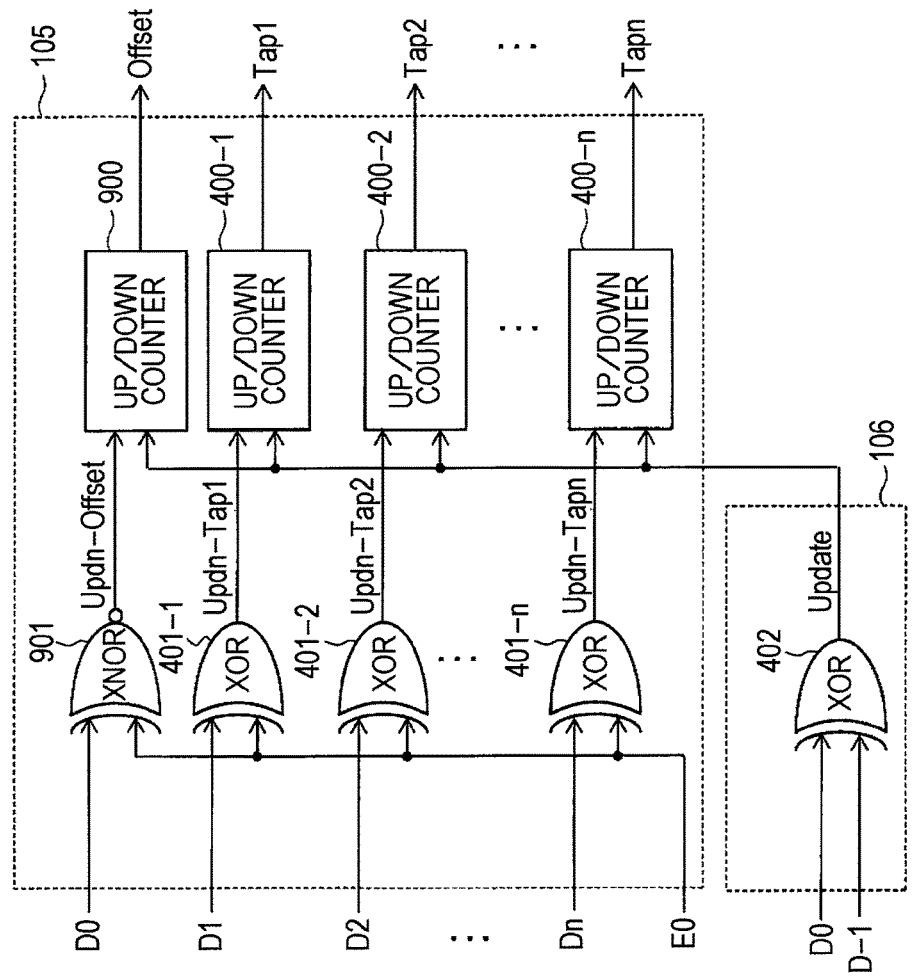
FIG. 9 is a block diagram illustrating a configuration of a tap coefficient calculation circuit according to the third embodiment.

FIG. 9 is a block diagram illustrating a configuration of the tap coefficient calculation circuit 105 according to the third embodiment. FIG. 9 illustrates a configuration of a filter circuit 106 in addition to the tap coefficient calculation circuit 105. However, the configuration of the filter circuit 106 is the same as the configuration of the filter circuit 106 described in FIG. 4, so that the description thereof will be omitted.

In the configuration of the tap coefficient calculation circuit 105 illustrated in FIG. 9, a circuit that forms the offset coefficient Offset is added with respect to the tap coefficient calculation circuit 105 illustrated in FIG. 4. First, the same part between the tap coefficient calculation circuit illustrated in FIG. 9 and tap coefficient calculation circuit illustrated in FIG. 4 will be described. The configuration of the up/down counters 400-1 to 400-n and the exclusive OR circuits 401-1 to 401-n in FIG. 9 is the same as the configuration of the up/down counters 400-1 to 400-n and the exclusive OR circuits 401-1 to 401-n in FIG. 4. In other words, a configuration of a part where the tap coefficients Tap1 to Tapn are formed is the same between FIGS. 9 and 4. Therefore, the description of the part where the tap coefficients Tap1 to Tapn are formed will be omitted.

As compared with FIG. 4, an up/down counter 900 and an exclusive NOR circuit 901 are added to the tap coefficient calculation circuit 105 illustrated in FIG. 9. The up/down counter 900 and the exclusive NOR circuit 901 form a circuit that forms the offset coefficient Offset. The exclusive NOR circuit 901 has two input ports, the reference data D0 is supplied to one input port of the two input ports, and the error data E0 is supplied to the other input port. The output of the exclusive NOR circuit 901 is supplied to the up/down counter 900 as an offset up/down signal Updn-Offset. The update control signal Update is further supplied to the up/down counter 900 and a count value of the up/down counter 900 is output from the tap coefficient calculation circuit 105 as the offset coefficient Offset.

In the same manner as the up/down counters 400-1 to 400-n, the up/down counter 900 is allowed to perform an up/down operation when the update control signal Update is low level (logical value 0), and the up/down counter 900 is prohibited to perform an up/down operation when the update control signal Update is high level (logical value 1). When the up/down counter 900 is allowed to perform the up/down operation, that is, when the update control signal Update is the low level, the up/down counter 900 performs an up operation or a down operation according to a supplied offset up/down signal Updn-Offset. A count value that is incremented by the up operation or a count value that is decremented by the down operation is output from the tap coefficient calculation circuit 105 as the offset coefficient Offset.

The exclusive NOR circuit 901 outputs the offset up/down signal Updn-Offset according to a combination of the code (logical value) of the reference data D0 and the code of the error data E0 (logical value). When the update is allowed by the update control signal Update, that is, when the update control signal Update is low level, the up/down counter 900 performs count up or count down according to the up/down signal Updn-Offset. A count value obtained by the count up or the count down is used as the data offset Vof of the error sampler 122. Therefore, it is possible to automatically adjust the data offset supplied to the error sampler 122 based on the reference data D0 and the error data E0.

The update of the up/down counter 900 is allowed by the update control signal Update from the filter circuit 106 only when the code of the reference data D0 and the code of the data D−1 after one symbol are coincident with each other. Therefore, a corresponding data offset is formed when the code of the reference data D0 and the code of the data D−1 after one symbol are coincident with each other, so that it is possible to improve the convergence property and the stability of the data offset supplied to the error sampler 122 as compared with a case where the data offset is formed regardless of the reference data D0 and the data D−1.

The update of the tap coefficients Tap1 to Tapn and the update of the offset coefficient Offset are controlled by the update control signal Update, so that it is possible to adjust the offset coefficient Offset, which is a data offset supplied to the error sampler 122, according to a change of the input data IW. In FIG. 3, when the input data IW changes as illustrated by the dashed line IW1A or IW2A, it is possible that the offset coefficient Offset indicates a voltage of the dashed line IW1A (IW2A) at the time t0. In the same manner, in FIG. 3, when the input data IW changes as illustrated by the dashed line IW3B or IW4B, it is possible that the offset coefficient Offset indicates a voltage of the dashed line IW3B (IW4B) at the time t0.

In FIGS. 8 and 9, in the same manner as in the first embodiment, an example is described in which the offset coefficient Offset is updated when the code of the reference data D0 and the code of the data D−1 after one symbol are coincident with each other. However, as described in the second embodiment, the offset coefficient Offset may be updated when the code of the reference data D0 and the code of the data D−1 after one symbol are not coincident with each other.

Further, in the second and the third embodiments, as described in the modified example of the first embodiment, the enable/disable of the function of the filter circuit 106 may be controlled by the filter enable signal FC.

The tap coefficient calculation circuit 105 and the filter circuit 106 are not limited to the configurations described in the first to the third embodiments, but can have various configurations.

Further, in the first to the third embodiments, the presence or absence of the update is controlled based on the code of the reference data D0 and the code of the data after one symbol. However, it is not limited to this. For example, the presence or absence of the update may be controlled based on the code of data a plurality of symbols after the reference data D0 instead of the code of data one symbol after the reference data D0 and the code of the reference data D0. Further, the presence or absence of the update may be controlled based on the codes of data of a plurality of symbols after the reference data D0 and the code of the reference data D0.

While the invention made by the inventors has been specifically described based on the embodiments, it is needless to say that the present invention is not limited to the embodiments and may be variously modified without departing from the scope of the invention.

What is claimed is:

1. An equalizer including an input buffer that receives an input signal, a decision feedback equalizer including a data sampler and an error sampler, and a tap coefficient calculation circuit that receives a data output from the data sampler and an error output from the error sampler and adaptively calculates a tap coefficient in the decision feedback equalizer, the equalizer comprising:
    a filter circuit that receives data of a predetermined first symbol as reference data and data of a second symbol after the predetermined first symbol in the data output from the data sampler,
    wherein an update of the tap coefficient in the tap coefficient calculation circuit is determined according to a result of the filter circuit, and
    wherein the filter circuit performs an exclusive OR operation between the first symbol and the second symbol, and, when an operation result of the exclusive OR operation indicates coincidence, the filter circuit causes the tap coefficient in the tap coefficient calculation circuit to be updated.

2. The equalizer according to claim 1, wherein the filter circuit receives an enable signal that disables updating of the tap coefficient in in the tap coefficient calculation circuit.

3. The equalizer according to claim 1, wherein the filter circuit receives the reference data and data of a plurality of symbols after the predetermined symbol.

4. The equalizer according to claim 1, wherein the error sampler performs sampling based on an offset coefficient from the tap coefficient calculation circuit, and the filter circuit causes the offset coefficient in the tap coefficient calculation circuit to be updated.

5. The equalizer according to claim 4, wherein, when the operation result of the exclusive OR operation indicates coincidence, the filter circuit causes the offset coefficient in the tap coefficient calculation circuit to be updated, and the tap coefficient calculation circuit updates the offset coefficient based on the first symbol and the error output from the error sampler.

6. The equalizer according to claim 1, wherein, when the operation result of the exclusive OR operation indicates non-coincidence, the filter circuit prohibits the tap coefficient in the tap coefficient calculation circuit from being updated.

7. An equalizer including an input buffer that receives an input signal, a decision feedback equalizer including a data sampler and an error sampler, and a tap coefficient calculation circuit that receives a data output from the data sampler and an error output from the error sampler and adaptively calculates a tap coefficient in the decision feedback equalizer, the equalizer comprising:
    a filter circuit that receives data of a predetermined first symbol as reference data and data of a second symbol after the predetermined first symbol in the data output from the data sampler,
    wherein an update of the tap coefficient in the tap coefficient calculation circuit is determined according to a result of the filter circuit, and
    wherein the filter circuit performs an exclusive NOR operation between the first symbol and the second symbol, and, when an operation result of the exclusive NOR operation indicates non-coincidence, the filter circuit causes the tap coefficient in the tap coefficient calculation circuit to be updated.

8. The equalizer according to claim 7, wherein the filter circuit receives an enable signal that disables updating of the tap coefficient in in the tap coefficient calculation circuit.

9. The equalizer according to claim 7, wherein the filter circuit receives the reference data and data of a plurality of symbols after the predetermined symbol.

10. The equalizer according to claim 7, wherein the error sampler performs sampling based on an offset coefficient from the tap coefficient calculation circuit, and the filter circuit causes the offset coefficient in the tap coefficient calculation circuit to be updated.

11. The equalizer according to claim 10, wherein, when the operation result of the exclusive NOR operation indicates non-coincidence, the filter circuit causes the offset coefficient in the tap coefficient calculation circuit to be updated, and the tap coefficient calculation circuit updates the offset coefficient based on the first symbol and the error output from the error sampler.

12. The equalizer according to claim 7, wherein, when the operation result of the exclusive NOR operation indicates coincidence, the filter circuit prohibits the tap coefficient in the tap coefficient calculation circuit from being updated.

13. An equalizer including an input buffer that receives an input signal, a decision feedback equalizer including a data sampler and an error sampler, and a tap coefficient calculation circuit that receives a data output from the data sampler and an error output from the error sampler and adaptively calculates a tap coefficient in the decision feedback equalizer, the equalizer comprising:
    a filter circuit that receives data of a predetermined first symbol as reference data and data of a second symbol after the predetermined first symbol in the data output from the data sampler,
    wherein the error sampler performs sampling based on an offset coefficient from the tap coefficient calculation circuit,
    wherein an update of the tap coefficient and an update of the offset coefficient in the tap coefficient calculation circuit are determined according to a result of the filter circuit based on the first symbol and the second symbol.

14. The equalizer according to claim 13, wherein the filter circuit performs an exclusive OR operation between the first symbol and the second symbol, and, when an operation result of the exclusive OR operation indicates coincidence, the filter circuit causes the tap coefficient and the offset coefficient in the tap coefficient calculation circuit to be updated.

15. The equalizer according to claim 13, wherein the filter circuit performs an exclusive NOR operation between the first symbol and the second symbol, and when an operation result of the exclusive NOR operation indicates non-coincidence, the filter circuit causes the tap coefficient and the offset coefficient in the tap coefficient calculation circuit to be updated.

16. The equalizer according to claim 13, wherein the filter circuit receives an enable signal that disables updating of the tap coefficient in in the tap coefficient calculation circuit.

17. The equalizer according to claim 13, wherein the filter circuit receives the reference data and data of a plurality of symbols after the predetermined symbol.

18. The equalizer according to claim 13, wherein the tap coefficient calculation circuit updates the offset coefficient based on the first symbol and the error output from the error sampler.

19. The equalizer according to claim 14, wherein, when the operation result of the exclusive OR operation indicates non-coincidence, the filter circuit prohibits the tap coefficient and the offset coefficient in the tap coefficient calculation circuit from being updated.

20. The equalizer according to claim 15, wherein, when the operation result of the exclusive NOR operation indicates coincidence, the filter circuit prohibits the tap coefficient and the offset coefficient in the tap coefficient calculation circuit from being updated.

* * * * *